Dec. 25, 1934.    F. D. BRADDON    1,985,277
FLAW DETECTOR FOR TUBULAR CONDUCTORS
Filed Oct. 28, 1933

Inventor
FRED D. BRADDON
By Joseph H. Lipschutz
Attorney

Patented Dec. 25, 1934

1,985,277

UNITED STATES PATENT OFFICE 1,985,277

FLAW DETECTOR FOR TUBULAR CONDUCTORS

Fred D. Braddon, Eltingville, N. Y., assignor to Sperry Products, Inc., Brooklyn, N. Y., a corporation of New York Application October 28, 1933, Serial No. 695,612

9 Claims. (Cl. 175—183)

This invention relates to the detection of defects in tubular conductors, more particularly, defects in the lead sheaths surrounding cables. The general principle of operation of this invention is similar to that in the patent of applicant and Francis H. Shepard, Jr. No. 1,946,189, granted February 6, 1934, and consists in causing potential contacts to traverse a spiral path around the periphery of a lead sheath cable through which current is passed, to detect any variations in normal potential drop caused by flaws such as variations in the thickness of the lead sheath, that is, eccentricities in the sheath, which will yield a greater or lesser drop in potential than a portion of the sheath whose wall has a normal thickness.

Certain types of cables are manufactured with a broad steel taping traversing a spiral path around the outside thereof in order to bind the cable strands together. It has been found that when a cable provided with such steel taping on its periphery was covered with a lead sheath which was then passed through the cable testing mechanism described above, the said steel taping introduced a variation in potential drop similar to that of an eccentricity in the lead sheath so that it was difficult and sometimes impossible to distinguish eccentricities from normal variations introduced by the steel taping.

It is the particular object of my invention, therefore, to provide a method of, and means for, testing lead sheaths on cables having steel taping, which will eliminate the variations introduced in the testing mechanism by the said taping.

Further objects and advantages of this invention will become apparent from the following detailed description.

In the accompanying drawing.

Figure 3:
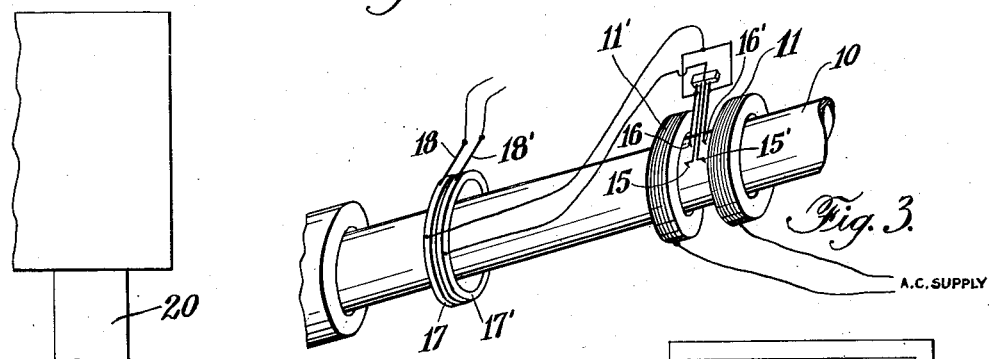
Fig. 3 is a perspective view illustrating the general principle of testing employed herein.
Figure 1:
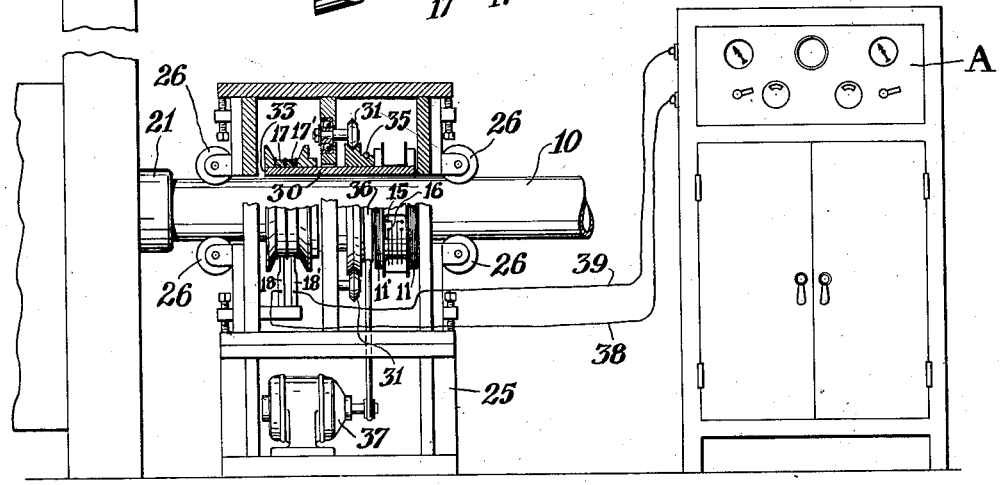
Fig. 1 is a front elevation partly sectioned vertically and with parts broken away showing a cable testing mechanism embodying my invention applied to a cable adjacent a lead press.

Referring first to Fig. 3, there is illustrated the general principle of testing tubular conductors for flaws such as eccentricities. This comprises passing current through the conductor 10 under test as by means of inducing coils 11, 11' which may be supplied with current from any suitable alternating current source to pass flux through the conductor 10. If desired, current from a D. C. source may be supplied by brushes engaging conductor 10. If there is caused to operate over the surface of conductor 10 a pair of potential contacts 15, 16, it will be seen that said contacts, if maintained in constant relation to each other, will normally measure a constant potential drop between the said contact points. As said contacts are caused to traverse a path around the circumference of tubular conductor 10 (by means to be described hereinafter) the potential drop measured by said contacts will be constant provided there are no flaws present, one of the principal flaws being eccentricity of the wall of the tube. The potential drop between contacts 15 and 16 may be transmitted to commutator rings 17, 17' from which the drop in potential may be taken off by brushes 18, 18' and suitably amplified as by means of an amplifier A, the output of which may be caused to actuate any suitable indicating system such as a signal or a pen or pens operating on a travelling chart.

One of the principal applications of such testing is in the case of the lead sheaths that are applied to cables as the cables are passed through a lead press 20. The lead is applied to the cables by means of dies and the lead sheath covered cable comes out of the press at 21. Adjacent this outlet 21 there is mounted the testing mechanism, as described above, said mechanism comprising a frame 25 through which the lead sheath covered cable 10 is adapted to be passed and guided therethrough by means of guide rollers 26. The coils 11, 11' and the contacts 15, 16 are supported upon a collar 30 which surrounds the cable 10 and is held in constant relation to the cable by means such as guide roller supports 31. The cable as it comes through the press and through frame 25 has a linear, axial movement and by imparting a rotating movement to contacts 15, 16 said contacts will traverse a spiral path around the periphery of the conductor 10. Such rotary movement may be imparted to the contacts 15, 16 by rotating the collar 30 within the guide rollers 31 by any suitable means such as a belt 35 operating on a hub 36 formed on the collar 30, the said belt 35 being driven from a suitable source of power such as motor 37. The collar 30 carries also the commutator rings 17, 17' and the brushes 18, 18', the said brushes being connected by conductors 38, 39 to the amplifier A.

Figure 2:
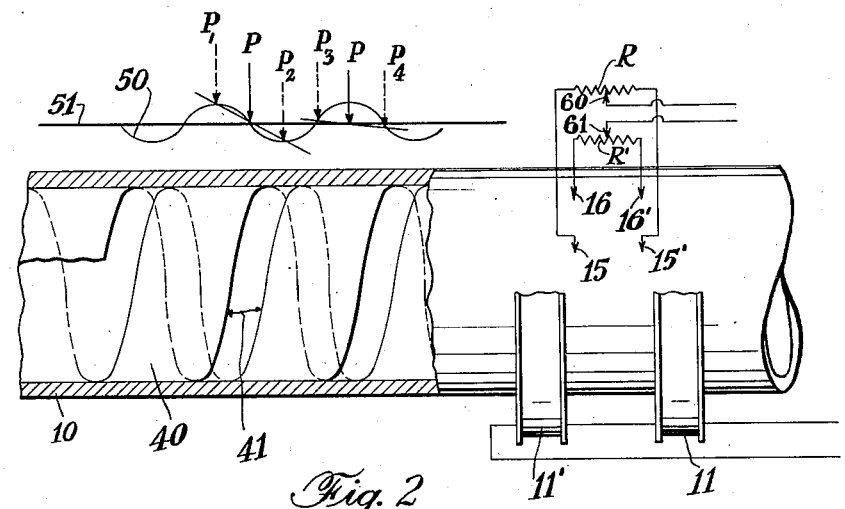
Fig. 2 is a front elevation, partly sectioned and partly diagrammatic, illustrating the theory underlying my invention.

It has been found that a special problem is introduced in the case of those cables which are provided with steel spiral taping 40, as shown in Fig. 2. The method of winding said taping leaves spaces 41 between the turns of the tape and as there is a different flux intensity in the region of the strands of the tape 40 from the flux intensity in the space 41 between the strands, the contacts 15 and 16 pick up a variable potential in their travel around the periphery of the lead sheath 10. This variation is in the form of a sine curve 50 which varies above and below a constant normal potential, indicated at 51 in the diagram.

In order to wipe out the variation indicated by the sine curve 50 and cause a constant normal potential to be picked off by the detector contacts as long as the conductor 10 was without flaw, I have provided the following arrangement: Instead of single contacts 15, 16 I have provided pairs of contacts 15, 15′ and 16, 16′. Each pair of contacts has connected therein a resistance R and R′ respectively. I then tap the central point of said resistances and it will now be understood that by means of these central taps 60, 61 I pick off the average drop in potential between contacts 15 and 15′ and the average drop in potential between contacts 16 and 16′. I then provide the further feature of spacing said pairs of contacts a distance equal to one-half the pitch of the spiral formed by the steel tape 40. The effect of this construction is disclosed in the diagram of Fig. 2. Since the variation in potential introduced by the steel tape spiral 40 is a sine curve 50, it will be seen that the potential drop between any two points spaced apart one-half cycle, that is to say, equivalent to one-half the pitch of the spiral 40, will have the same average drop in potential at any point along the sine curve. Thus, for instance, take the points $P_1$ and $P_2$ half a cycle apart or one-half the pitch of spiral 40. The average potential is shown at P. Similarly, take two other points $P_3$, $P_4$ spaced half a cycle apart on some other part of the curve, the average potential is again P. In other words, by spacing contacts 15, 15′ and 16, 16′ a distance apart equivalent to one-half the pitch of the spiral formed by steel tape 40, the normal average drop in potential as picked off contacts 60 and 61 will always be constant provided no flaw is present in the conductor 10, and any variations from said normal potential indicated by the line 51 in the graph will be due to a flaw such as eccentricity.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described by invention, what I claim and desire to secure by Letters Patent is:

1. In a flaw detector for electrical conductors, means for passing current therethrough, a plurality of spaced potential contact means adapted to be moved with respect to said conductor, each of said potential contact means having means for averaging the potential drop over a predetermined distance and means responsive to the difference between said average potentials.

2. In a flaw detector for electrical conductors, means for passing current therethrough, sets of potential contacts adapted to be moved with respect to said conductor, means for maintaining said sets of contacts a constant distance apart, means for averaging the potential drop in each set of contacts, and means responsive to the difference between said average potentials.

3. In a flaw detector for electrical conductors, means for passing current therethrough, sets of potential contacts adapted to be moved with respect to said conductor, means for maintaining said sets of contacts a constant distance apart, means for averaging the potential drop in each set of contacts, said last named means comprising a resistance interposed between each set of contacts, and a contact tapping each of said resistances at the central point, and means responsive to the difference between said average potentials.

4. In a flaw detector for tubular conductors, means for passing current therethrough, a plurality of potential contact means spaced circumferentially and adapted to be moved around the periphery of said conductor, each of said potential contact means having means for averaging the potential drop over a predetermined distance, and means responsive to the difference between said average potentials.

5. In a flaw detector for tubular conductors, means for passing current therethrough, sets of potential contacts spaced circumferentially and adapted to be moved around the periphery of said conductor, means for averaging the potential drop in each set of contacts, and means responsive to the difference between said average potentials.

6. In a flaw detector for tubular conductors, means for passing current therethrough, sets of potential contacts spaced circumferentially and adapted to be moved around the periphery of said conductor, means for averaging the potential drop in each set of contacts, said last-named means comprising a resistance interposed between each set of contacts and a contact tapping each of said resistances at the central point, and means responsive to the difference between said average potentials.

7. In a flaw detector for lead sheaths on cables which are spirally wound with a conductor, means for passing current through the sheath, a plurality of potential contact means spaced circumferentially and adapted to be moved around the periphery of the sheath, said spiral winding on the cable causing a regular variation in potential drop from maximum to minimum, each of said potential contact means having means for averaging the potential drop over a distance equal to one-half the pitch of the spiral winding, and means responsive to the difference between said average potentials.

8. In a flaw detector for lead sheaths on cables which are spirally wound with a conductor, means for passing current through the sheath, sets of potential contacts spaced circumferentially and adapted to be moved around the periphery of the sheath, said spiral winding on the cable causing a regular variation in potential drop from maximum to minimum, means for averaging the potential drop in each set of contacts over a distance equal to one-half the pitch of the spiral winding, and means responsive to the difference between said average potentials.

9. In a flaw detector for lead sheaths on cables which are spirally wound with a conductor, means for passing current through the sheath, sets of potential contacts spaced circumferentially and adapted to be moved around the periphery of the sheath, said spiral winding on the cable causing a regular variation in potential drop from maximum to minimum, means for averaging the potential drop in each set of contacts over a distance equal to one-half the pitch of the spiral winding, said last-named means comprising a resistance interposed between each set of contacts, the contacts of each set being spaced axially of the cable a distance equal to one-half the pitch of the spiral winding, and a contact tapping each of said resistances at the central point and means responsive to the difference between said average potentials.

FRED D. BRADDON.